United States Patent [19]
Vesterinen

[11] Patent Number: 5,870,462
[45] Date of Patent: Feb. 9, 1999

[54] METHOD AND SYSTEM FOR CONTROLLING THE OPERATION OF A TELEPHONE EXCHANGE FROM A SUBSCRIBER CONNECTION

[75] Inventor: Timo Vesterinen, Espoo, Finland

[73] Assignee: Nokia Telecommunications Oy, Espoo, Finland

[21] Appl. No.: 530,333

[22] PCT Filed: Apr. 5, 1994

[86] PCT No.: PCT/FI94/00131

§ 371 Date: Nov. 30, 1995

§ 102(e) Date: Nov. 30, 1995

[87] PCT Pub. No.: WO94/23523

PCT Pub. Date: Oct. 13, 1994

[30] Foreign Application Priority Data

Apr. 6, 1993 [FI] Finland ................................. 931559

[51] Int. Cl.⁶ ........................ H04M 3/42; H04M 11/00; H04M 3/00
[52] U.S. Cl. .................... 379/201; 379/93.14; 379/196; 379/242
[58] Field of Search .................................... 379/201, 157, 379/207, 219, 220, 242, 93.01, 93.14, 196, 197, 198, 210, 211, 215, 216, 142, 246

[56] References Cited

U.S. PATENT DOCUMENTS

| 4,277,649 | 7/1981 | Sheinbein | 379/201 |
|---|---|---|---|
| 4,747,127 | 5/1988 | Hansen et al. | 379/93.14 |
| 4,897,866 | 1/1990 | Majmudar et al. | 379/201 X |
| 5,309,509 | 5/1994 | Cocklin et al. | 379/207 X |
| 5,323,452 | 6/1994 | Dickman et al. | 379/201 |

FOREIGN PATENT DOCUMENTS

| 8502510 | 6/1985 | WIPO | 379/201 |
|---|---|---|---|

OTHER PUBLICATIONS

Patent Abstracts of Japan, Publication No. 03222559, Oct. 1, 1991, Application No. 02016268, Telephone Exchange.

Patent Abstracts of Japan, Publication No. 60257644, Dec. 19, 1985, Application No. 69114232, Data Registering System of Exchange.

Ljungblom, "A Service Management System for the Intelligent Network", Ericsson Review No. 1, 1990, pp. 32–41.

*Primary Examiner*—Harry S. Hong
*Attorney, Agent, or Firm*—Pillsbury Madison & Sutro LLP

[57] ABSTRACT

A method and a system for controlling the operation of a telephone exchange from a subscriber connection. A direct communication connection is established between a subscriber connection and a telephone exchange control unit. One or more command macros executing a predetermined task with associated parameters are supplied from the subscriber connection to the telephone exchange control unit. The commands of the given command macro are executed in the control unit under the control of the parameters associated with each command.

6 Claims, 1 Drawing Sheet

METHOD AND SYSTEM FOR CONTROLLING THE OPERATION OF A TELEPHONE EXCHANGE FROM A SUBSCRIBER CONNECTION

This application claims benefit of international application PCT/FI94/00131 filed Apr. 5, 1994.

BACKGROUND OF THE INVENTION

This invention relates to a method and a system for controlling the operation of a telephone exchange from a subscriber connection.

In the design of digital telephone exchanges, various teleservices and control capabilities required by them are becoming increasingly important. Competing operators offer a wide variety of modern teleservices to tempt customers to their networks. Standardization authorities have also specified a plurality of services that will be standard properties in the telephone exchanges of all manufacturers.

Modern teleservices include various capabilities for manipulating telephone exchange data, which can be performed by a subscriber connected to the telephone exchange as subscribed control operations. In such a case, the subscriber defines the service or changes data associated with the service from his or her own telephone. The operator of the telephone exchange thereby has to guarantee that each subscriber has access only to his or her own data.

Services are also known in which the subscriber of a service consists of a group of subscribers. One example of such services is the Centrex service, in which a group of subscribers forms a private branch exchange (PBX), each of the subscribers being provided with services normally offered to PBX subscribers. There are also other services in which so-called virtual networks, i.e. service groups, are formed within a public exchange. Even in such cases the customer often also wants to manage his or her own virtual network. A problem therewith is how to offer a data management connection which gives access to the subscriber's own virtual network data whereas no other data are available to the subscriber.

Exchange systems normally comprise an operation control interface through which all required changes in data can be made. The operation control interface comprises several hundreds of different commands for managing the data and the operation of the exchange. The command system also comprises verification of access rights, which allows each telephone exchange operator to have individually specified access rights to the different commands. A drawback of the systems presently in use is, however, that the right to use a specific command cannot be confined to certain subscriber connections only. For example, if an operator has been authorized to change the parameters of subscriber services, the same operator has simultaneously been authorized to manipulate the parameters of all the subscribers of the exchange. The present-day systems do not allow distribution of the impact of a command on a virtual network basis, which has prevented extensive offering of control operations that may be performed via subscriber connections. In practice, this type of services is limited to very simple changes made by the subscriber in functions such as speech transfer.

More demanding data manipulation by the subscriber has to be performed by utilizing a front end computer. The subscriber's operator establishes a connection with the front end computer and manipulates data concerning its own virtual network by software designed for the purpose. The front end computer, at simplest a PC or a UNIX-based minicomputer, keeps record of the virtual networks and associated objects. The front end computer then establishes the actual connection with the exchange and executes the required commands to effect changes.

SUMMARY OF THE INVENTION

This invention relates to a method and a system for controlling the operation of a telephone exchange from a subscriber connection, by means of which a telecommunications operator is able to provide subscribers with different access rights to a public operation control interface directly via the subscriber connection without the need of separate front end computers. To achieve this, the method according to the invention is characterized by establishing a direct communication connection between a subscriber connection and a telephone exchange control unit; supplying one or more command macros executing a predetermined task with associated parameters from the subscriber connection to the telephone exchange control unit; and executing the commands of the supplied command macro in the control unit under the control of the parameters associated with each command.

The system according to the invention is characterized in that it comprises a direct communication connection between a subscriber connection and a telephone exchange control unit; a control unit interface program for putting into effect command macros performing predetermined tasks supplied from the subscriber connection; and parameters associated with each command macro, with the aid of which parameters the execution of the commands of a supplied command macro to be executed in the control unit of the subscriber's exchange is controlled.

The implementation of the invention thus comprises an interface program operating between the exchange control unit and the subscriber connection to provide the subscriber with direct access to the standard user interface of the exchange system through the call routing of the exchange, which means that the interface has a normal subscriber number, to which the subscriber calls. The subscriber is thus given access, instead of an actual operation control interface to the telephone exchange, to the execution of one or more predetermined macrocommands in the exchange control unit. A password that the subscriber gives to access the exchange control system is preferably also used as a keyword for macrocommands available to the subscriber, so that any unauthorized commands are automatically excluded from a session.

The operator offering teleservices is capable of generating macrocommands easily and in a controlled manner. Macros consist of commands of the telephone exchange control unit, which together effect task execution covering the subscriber's connection or virtual network. Pre-specified command parameters written in the macros define not only the subscriber's access rights to the operation control of the telephone exchange but also the objects and facilities the set values of which the subscriber is authorized to change.

The macros are disassembled in the control computer of the telephone exchange into individual commands so that the required command sessions to the target system are embedded sessions for the subscriber.

The operations performed by the subscriber take place through interactive communication. The interface program controls the conversation and switches the required responses (acoustic signals, announcements) to the subscriber at different stages of the conversation by utilizing the call control. For an ISDN subscriber, it is possible to utilize a digital data link and to effect the communication as a normal terminal connection.

DESCRIPTION OF THE DRAWINGS

In the following the invention will be described more fully by way of example with reference to the attached drawings, in which.

DETAILED DESCRIPTION

Figure 1:
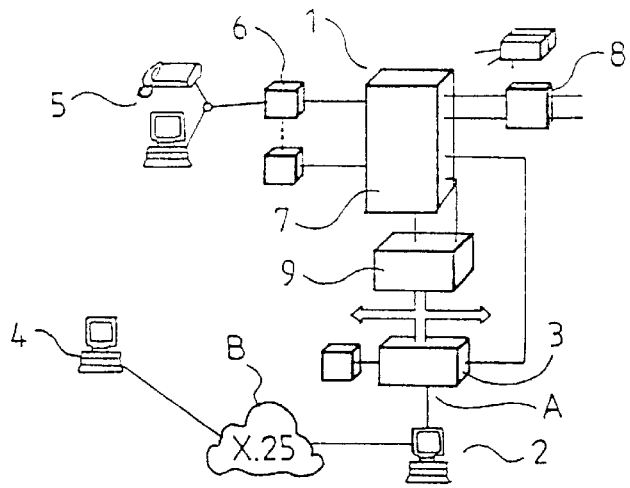
FIG. 1 shows a digital telephone exchange provided with conventional operation control connections.

FIG. 1 shows a digital telephone exchange 1 provided with conventional operation control connections. The telephone exchange comprises a control and maintenance unit 3 having an operation control connection A. Required changes in data can be performed by a terminal 2 connected to the operation control connection. According to the prior art, the terminal 2 may also be a front end computer, whereby the subscriber himself or herself is able to put into effect the required changes by using his or her own computer 4 through a packet network B.

In the case of a front end computer, the subscriber establishes a connection with the front end computer and manipulates matters concerning his or her own virtual network by software designed for the purpose. The front end computer, at its simplest a PC or a UNIX-based minicomputer, keeps record of the virtual networks and associated objects. The front end computer 2 then establishes the actual connection with the telephone exchange and executes the commands required to effect the changes. Other important components of the telephone exchange 1 shown in FIG. 1 include subscriber-specific connections 5, subscriber modules 6, a switching field 7, network terminal equipment 8 and a call control computer 9.

Figure 2:
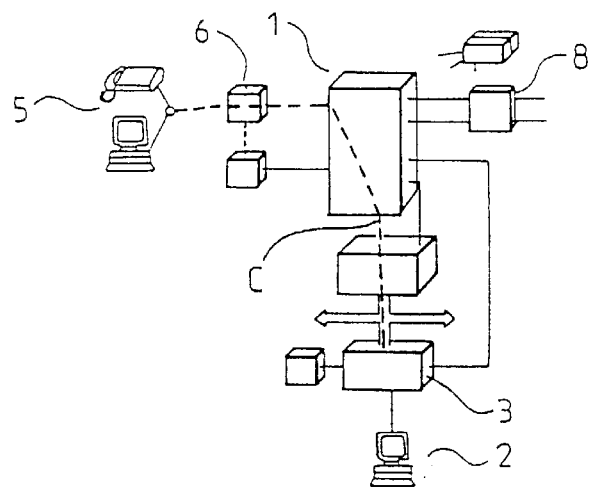
FIG. 2 shows a digital telephone exchange provided with an operation control connection according to the invention.

FIG. 2 shows the digital telephone exchange of FIG. 1 when provided with an operation control connection according to the invention. In the system according to the invention, the normal call control software of the control and maintenance unit 3 is completed by an interface program establishing a direct connection C from the subscriber connection 5 to the control and maintenance unit 3 of the telephone exchange. The interface program generates its own number in the number space of the exchange, to which number the subscriber can call from the subscriber connection in a normal way. This kind of connection can be arranged by normal updating of the analysing and routing data of the telephone exchange. The calling subscriber registers with his or her identity number, on the basis of which his or her access rights to the control unit of the exchange are determined.

Figure 3:
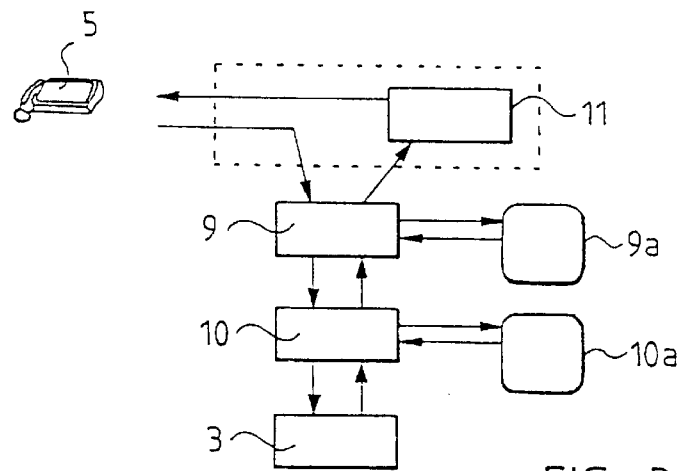
FIG. 3 is a block diagram illustrating the principal features of a system according to the invention.

FIG. 3 is a block diagram illustrating the operation of the system according to the invention. The interface program 10 implementing the method according to the invention controls the interactive communication between the subscriber 5 and the exchange control unit 3. Entering a command session takes place by utilizing an identity number assigned to the subscriber, which also specifies the macrocommands available to the subscriber. Tailored macrocommands 10a are compiled by the telecommunications operator at the same time as the operations to be controlled by the subscriber are agreed on. The macros contain real exchange commands, depending on the functions to be used with each subscriber. The macros are pre-specified so that the subscriber accesses only his own data or the data of his own virtual network. Accordingly, the execution of the commands of each command macro is controlled at least partly by prespecified, i.e. fixed parameters, and partly by parameters specified during the session.

Interactive communication with the subscriber proceeds under the control of the interface program 10. By utilizing the call control computer 9, the program is able to switch the required acoustic signals or even announcements in plain text (block 11) at appropriate communication stages. The ISDN subscriber (2B+D) may establish a direct data connection e.g. by a terminal or micro and perform the desired command session by using macros available to him.

The format of the command macro according to the invention, which can be executed by the subscriber, is as follows:

Macro: (par1, par2, . . parn; par*1, par*2 . . par*N), which is as follows when disassembled into separate commands:

command1: (par1, par2, . . parn; par*1, par*2, . . par*N) command2: (par1, par2, . . parn; par*1, par*2, . . par*N)

.

.

commandM: (par1, par2, . . parn; par*1, par*2, . . par*N)

Each command macro comprises pre-specified or fixed parameters par1–parn, which define the command which the subscriber is allowed to put into effect in the exchange control unit and a predetermined target group of subscriber connections. The pre-specified command parameters par*1–par*N written in the macros specify accurately the access rights of the subscriber with regard to the exchange operation control unit and the objects the contents of which the subscriber is allowed to change.

An example of a command session put into effect by the subscriber is the switching to be performed by the attendant of a Centrex exchange in order to block calls to service numbers through that exchange. The pre-specified parameters (parx) of the macrocommand that performs the blocking include the number or identity of the Centrex exchange, and the parameters (par*x) to be specified by the subscriber include e.g. the target group of the blocking command (the blocking need not concern all numbers of the exchange), the number combination to be blocked (e.g. 9700), and possibly data specifying the blocking command in some other way. In the example, changes made by the subscriber affect the call control database 9a of FIG. 3 such that the use of numbers beginning with 9700 is blocked in all or some of the telephones of the Centrex exchange.

It is obvious to one skilled in the art that the different embodiments of the invention are not limited to the examples set forth above but they may vary within the scope of the attached claims.

I claim:

1. A method for controlling operation of a telecommunications system which includes a telephone exchange having a telephone exchange control unit, at least one interface program, at least one subscriber, a communications line between the exchange and the subscriber, and a number space for a dialing number corresponding to each respective interface program, said method comprising the steps of:

creating a dialing number in the number space corresponding to a said interface program;

defining at least one command corresponding to a predetermined task into said telephone exchange, each said at least one command being responsive to said dialing number and having associated parameters;

establishing a direct communication connection between said subscriber and said telephone exchange control unit by said subscriber dialing said dialing number, thereby identifying the respective at least one command;

identifying said subscriber in the exchange;

checking access rights of said subscriber to said telephone exchange control unit, and, in case said subscriber has a respective access right to said telephone exchange control unit:

supplying from said subscriber to said telephone exchange control unit at least one of said parameters for executing a predetermined task defined by the respective said at least one command; and executing the respective said at least one command in said control unit under control of the respective said parameters associated therewith.

2. The method according to claim 1, further comprising:

providing at least some of said parameters, in advance of said supplying, as predetermined parameters.

3. The method according to claim 2, further including:

said supplying includes specifying of respective ones of said parameters by said subscriber during a session between said subscriber and said telephone exchange control unit; and controlling said executing at least partly by said respective ones of said parameters.

4. The method according to claim 1, further comprising:

said supplying includes specifying of respective ones of said parameters by said subscriber during a session between said subscriber and said telephone exchange control unit; and controlling said executing at least partly by said respective ones of said parameters.

5. A telecommunications system, comprising:

a telephone exchange;

a subscriber;

a communications line between said exchange and said subscriber;

said telephone exchange including a telephone exchange control unit comprising at least one interface program, and a number space having a number corresponding to each respective interface program;

said telephone exchange further comprising means for creating a dialing number in said number space corresponding to said interface program;

means for defining at least one command corresponding to a predetermined task in said telephone exchange, said at least one command being responsive to said dialing number and at least one associated parameter;

a direct communication connection between said subscriber and said telephone exchange control unit;

identifying means for identifying said subscriber in said exchange;

checking means for checking access rights of said subscriber to said telephone exchange control unit, and, in case said subscriber has a respective access right to said telephone exchange control unit, said direct communication connection being arranged to supply to said telephone exchange control unit said at least one command having at least one associated parameter; and a control unit interface program arranged for putting into effect said at least one command when identified by said subscriber by dialing said dialing number, for performing a respective said predetermined task defined by said at least one command with the aid of the respective at least one said associated parameter.

6. The system according to claim 5, wherein:

said means for defining at least one command is arranged to define at least one said command such that command comprises a plurality of parameters at least one of which is arranged to specified during a session between said subscriber and said telephone exchange control unit, execution of the respective said command being arranged to be controlled by the respective at least one parameter from among said plurality of parameters.

\* \* \* \* \*